Feb. 17, 1931.  C. MOXLEY  1,792,653
APPARATUS FOR CRACKING OFF AND HANDLING SHEET GLASS
Filed Jan. 17, 1928  4 Sheets-Sheet 1
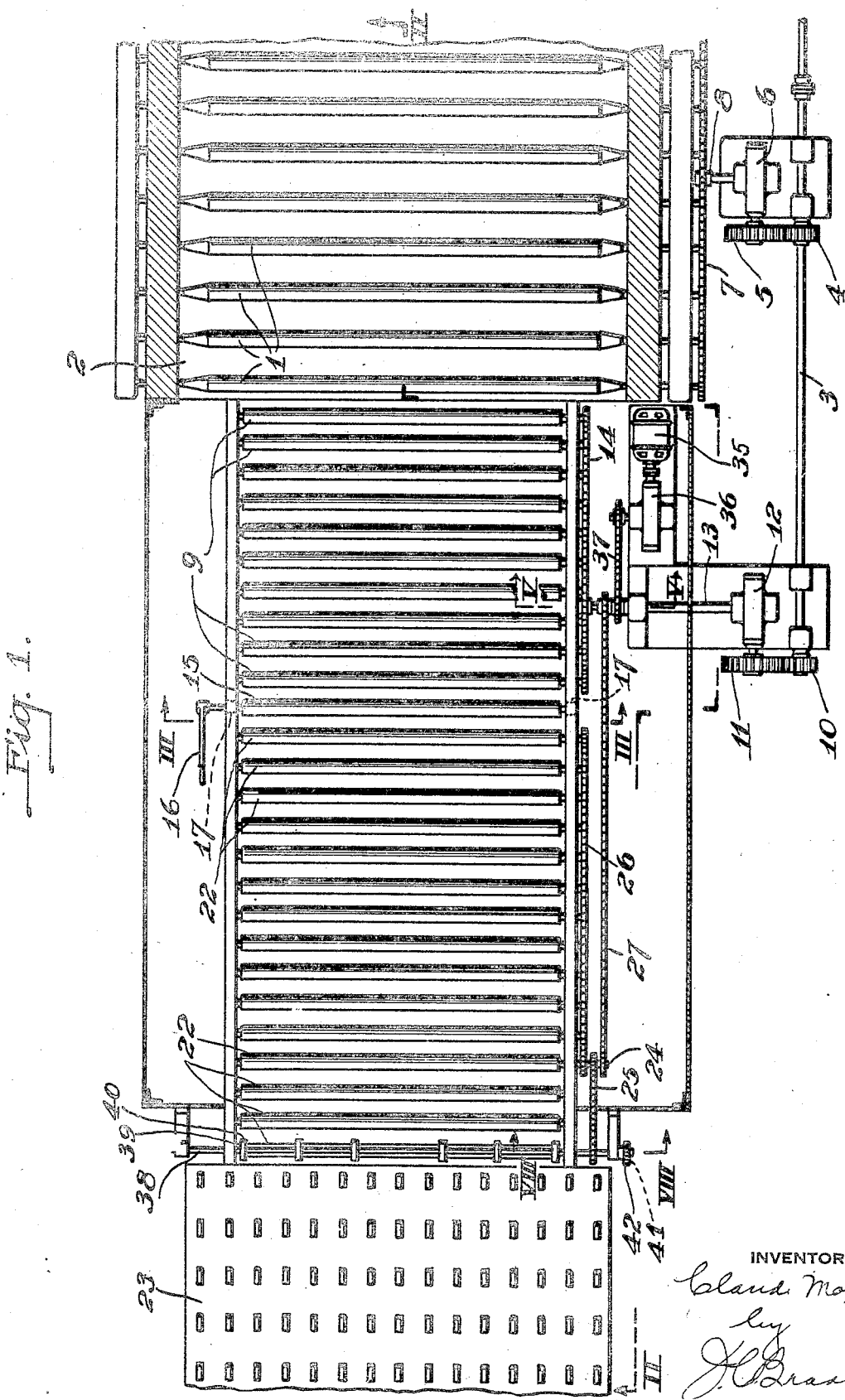

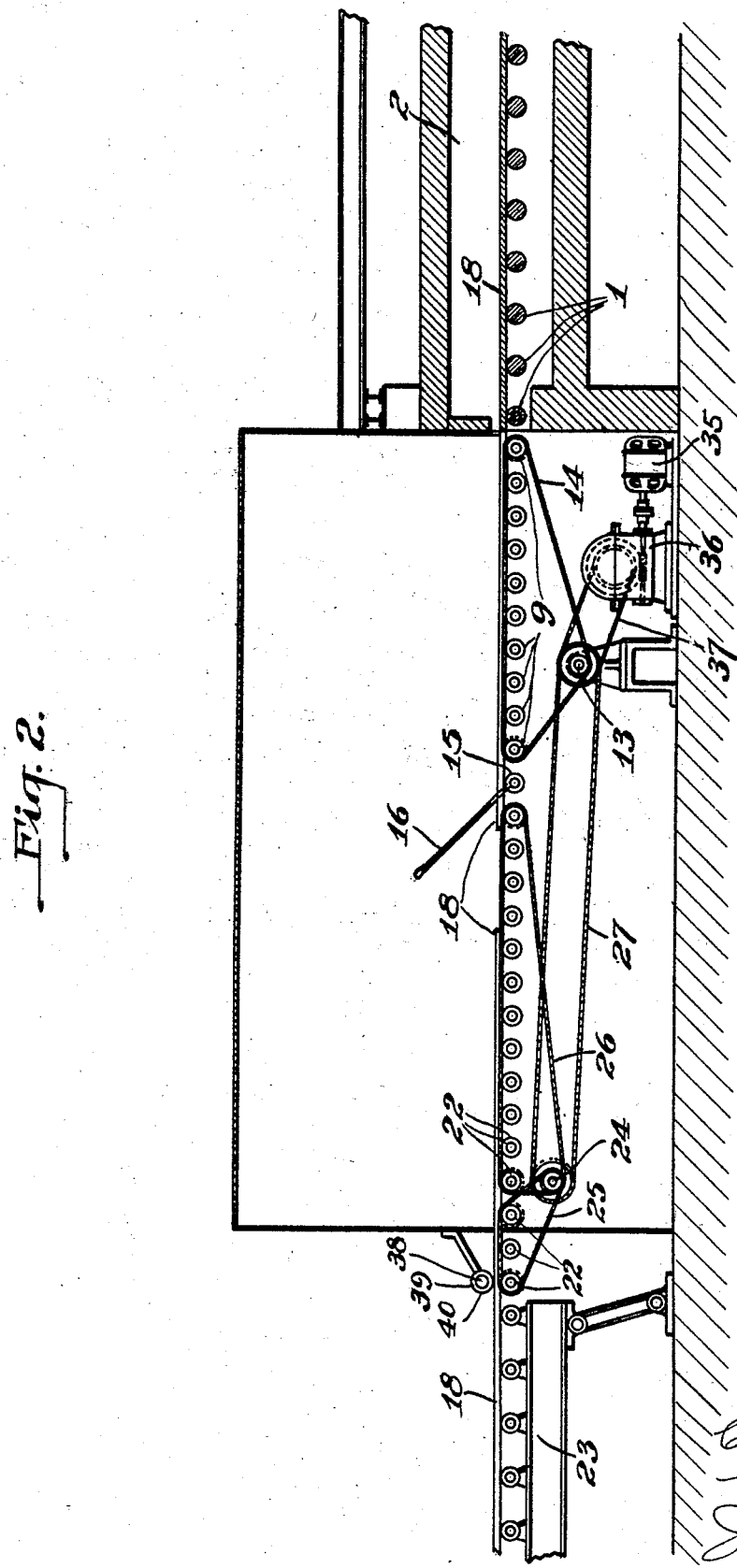

Feb. 17, 1931.  C. MOXLEY  1,792,653
APPARATUS FOR CRACKING OFF AND HANDLING SHEET GLASS
Filed Jan. 17, 1928  4 Sheets-Sheet 3
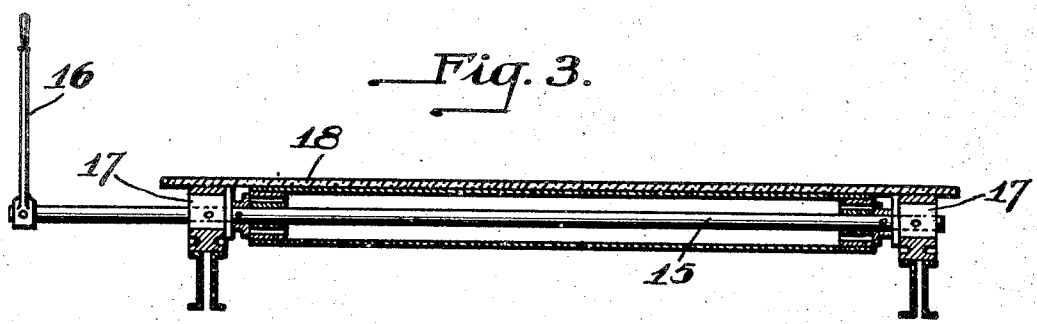
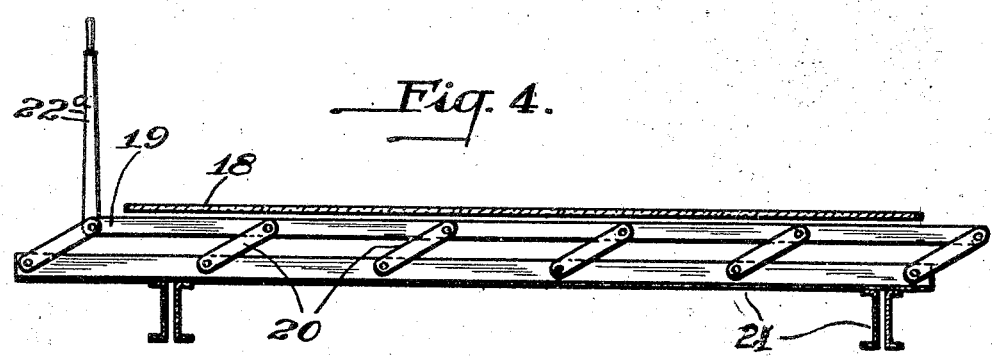
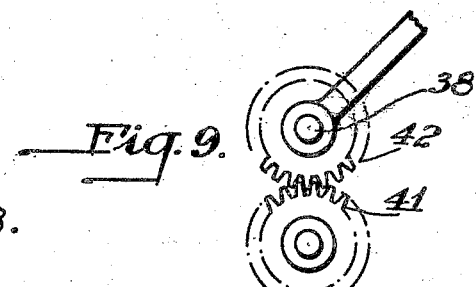
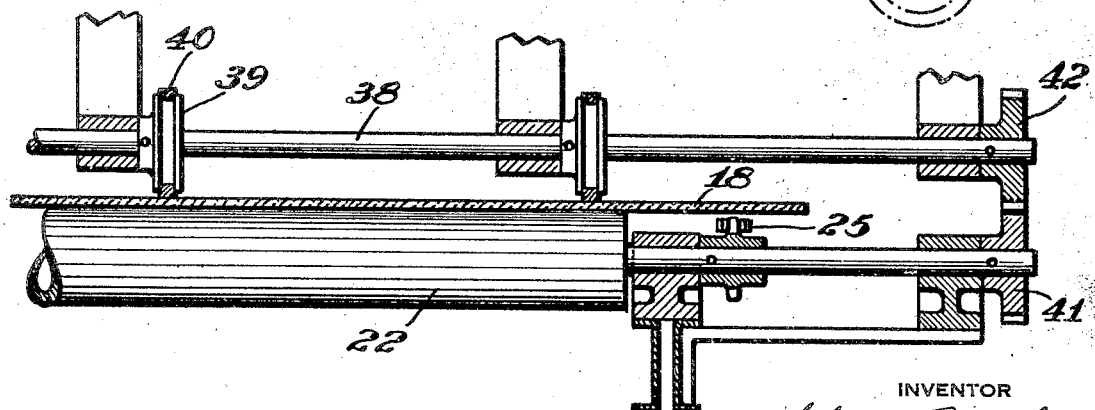
INVENTOR
Claude Moxley
by
James C Brasey
Atty Patented Feb. 17, 1931

1,792,653

UNITED STATES PATENT OFFICE

CLAUD MOXLEY, OF FORD CITY, PENNSYLVANIA, ASSIGNOR TO PITTSBURGH PLATE GLASS COMPANY, A CORPORATION OF PENNSYLVANIA

APPARATUS FOR CRACKING OFF AND HANDLING SHEET GLASS

Application filed January 17, 1928. Serial No. 247,301.

The invention relates to apparatus for use at the outlet end of a roller leer in connection with a continuous process, in which a sheet or ribbon advances through the leer, or in connection with an intermittent process, in which the sheets generated and advanced through the leer are of such length that they must be cut into several sections for convenient handling.

Figure 5:
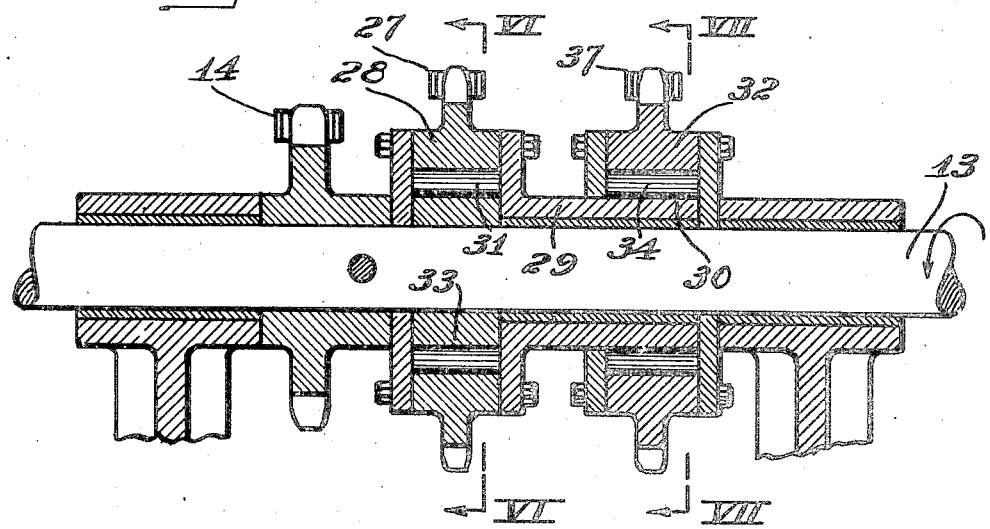
Figure 6:
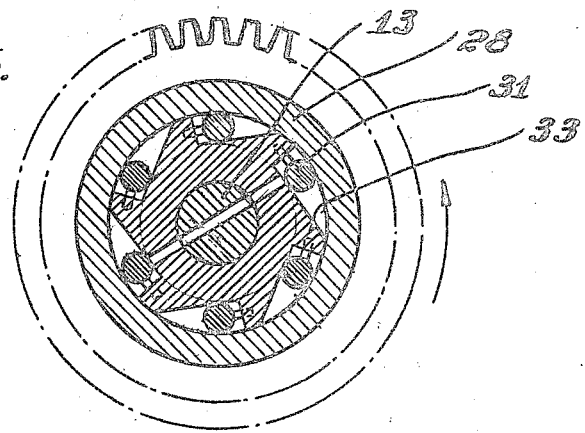
Figure 7:
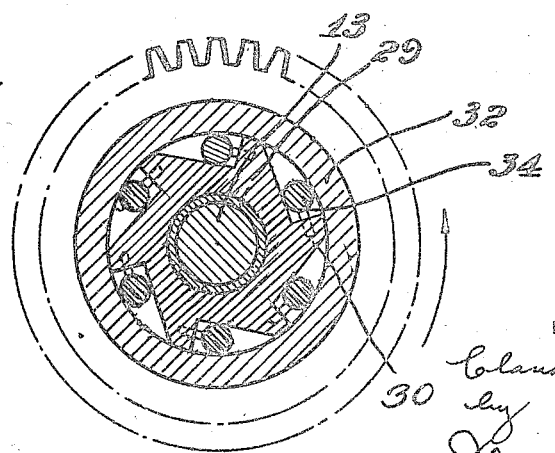

It has for its objects the provision of improved means for cracking off the successive sheets after the glass has been scored transversely with a diamond or wheel, and the provision of improved means for getting the sheets out of the way quickly after they are cracked off. Certain embodiments of the invention are illustrated in the accompanying drawings, wherein:

Figure 1 is a plan view. Fig. 2 is a section on the line II—II of Fig. 1. Fig. 3 is a section on the line III—III of Fig. 1. Fig. 4 is a section corresponding to that of Fig. 3, but through a modified form of construction. Figs. 5, 6 and 7 are enlarged detail views, Fig. 5 being a section on the line V—V of Fig. 1, and Figs. 6 and 7 being sections respectively on the lines VI—VI and VII—VII of Fig. 5. Fig. 8 is an enlarged section on the line VIII—VIII of Fig. 1. And Fig. 9 is an end elevation of the Fig. 8 construction.

Referring to the drawings, 1, 1, 1, etc. are the rolls at the outlet end of the leer 2 through which a continuous sheet or ribbon is carried, or a plurality of relatively long separate sheets. These rolls are driven from the line shaft 3 through the intermediary of the gears 4 and 5, the worm gearing in the casing 6 and the sprocket chain 7, which passes around a sprocket on the shaft 8 and suitable sprockets on the ends of the roll shafts.

Just in advance of the rolls 1, 1, 1 is another set of rolls 9, 9, 9, etc. also driven from the line shaft 3, such drive being accomplished through the intermediary of the spur gears 10 and 11, the worm wheel and worm in the casing 12, the shaft 13, and the sprocket chain 14 passing around suitable sprockets on the ends of the shaft 13 and on the ends of the rolls 9, 9, 9, etc.

Next to the end roll 9 is a cracking off roll 15, shown in detail in Fig. 3, such roll not being driven, but having its axle provided with an operating handle 16. The ends of this roll are mounted in a pair of bushings 17, 17, whose centers are eccentric with respect to the center line of the roll 15, these bushings being pinned to the ends of the roll axle. When the roll is in the position shown in Fig. 3, the glass sheet 18 engages the roll without any substantial pressure. When it is desired to crack off the sheet, the handle 16 is rotated so as to raise the axle of the roll 15, thus applying pressure to the glass sheet tending to lift it. The glass sheet which was scored transversely with a diamond or wheel before it reached the roll 15 will readily break when this lifting pressure is applied, thus detaching a section of the glass sheet.

Fig. 4 shows an alternative means for securing the cracking off function. In this arrangement, the bar 19 takes the place of the roll 15, such bar being mounted upon the ends of the levers 20, pivoted at their lower ends to the frame 21, which carries the rollers. A combined bell crank lever and handle 22a is secured to the end of the bar 19, and when it is desired to crack off the sheet, the upper end of the handle is swung to the left (Fig. 4) raising the bar 19 and applying pressure to the sheet tending to lift it, so that it will be cracked off along the line at which it is scored.

In advance of the cracking off roll 15 is still another series of rolls 22, 22, 22, etc., which are so arranged that they may be driven either at the speed of the rolls 1, 1, 1, etc. and 9, 9, 9, etc. or at a much higher speed, the second drive being accomplished by means of a separate motor. The high speed drive of the rolls 22, 22, 22, etc. comes into play after the glass sheet has been cracked off, as above described, at which time it is desirable to get the severed sheet onto the glass receiving table 23 quickly and out of the way before the next sheet arrives.

The rolls 22, 22, 22, etc. are driven from a countershaft 24, which is provided with a pair of sprockets around which the sprocket chains 25 and 26 pass, such chains also passing around suitable sprockets on the ends of the roll shafts 22, 22, 22, etc. The rolls 22, 22, 22, etc. might be driven from a single sprocket chain instead of from two sprocket chains without affecting the functional operation of the apparatus, the two chain drives being employed merely for reasons of mechanical expediency, which it is unnecessary to explain. The countershaft 24 is driven by means of the chain 27, which passes around a sprocket keyed to the shaft 24 and around a sprocket 28 (Fig. 5) supported for rotation upon the shaft 13 heretofore referred to. The sprocket 28 may be driven either at a slow speed from the shaft 13 or at a higher speed from a separate motor after the glass sheet has been cracked off and it is desired to run it quickly off of the rolls 22, 22, 22, etc. The sprocket 28 is geared to the shaft 13 (Fig. 5) by means of the one way pin clutch including the toothed member 33 and the rollers 31. The sleeve 29 is bolted at its left hand end to the sprocket 28 and carries the sprocket 32 on its right hand end, which is driven from the motor 35. This sprocket drives the sleeve 29 by means of the one way pin clutch including the toothed member 30 on the sleeve 29 and the rollers 34. The sprocket 32 is driven from the motor 35 (Fig. 1) through the intermediary of worm gearing in the casing 36, a sprocket on the worm shaft and the chain 37, which passes around the sprocket 32. Up until the time the sheet is cut off, the sprocket 28 (which drives the rolls 22, 22, 22, as above explained) is driven at the speed of the rolls 1, 1, 1 and 9, 9, 9 from the shaft 13, such shaft driving the sprocket 28 through the clutch 33, 31. After the sheet is cut off, the sprocket 28 is driven at a high speed from the motor 35, since at this time, the high speed drive of the sprocket 32 from the motor 35 rotates the sleeve 29 and drives the sprocket 28 at a correspondingly high speed through the intermediary of the clutch 30, 34. At this time, the other one-way clutch 33, 31 affords no interference, since it is being run in a direction such as to carry the rollers 31 toward non-clutching or inoperative position, as is characteristic of clutches of this type. As soon as the glass passes from the rollers 22, 22, 22, etc., the motor 35 is stopped, so that the high speed drive is interrupted and the low speed drive of these rollers immediately picks up, the continuously rotating shaft 13 now driving the sprocket 28 through the intermediary of the clutch 33, 31 as heretofore described.

The high speed drives of the rolls 22, 22, 22, etc. may be at such a rate that the glass will coast entirely off of the table onto the glass receiving table 23 without any additional assistance, but in order to insure that the sheet will entirely clear the last of the rollers 22, 22, 22, etc. a separate feed roll is employed above the glass opposite the last roll 22. This roll comprises an axle 38 (Fig. 8) to which are keyed a series of wheels 39 provided with the rubber tires 40. This shaft is driven from the shaft of the roll 22 by means of the spur gears 41 and 42. The tires of the wheels 39 yieldingly engage the glass pressing it against the roller 22, so that the sheet is positively fed onto the table 23.

What I claim is:

1. In combination with a roller leer, a roller runway at the end of the leer for receiving the glass sheet as it emerges from the leer, a cracking off member extending transversely of the runway short of the end thereof below the glass, and mounted for vertical movement, means for moving said member upward so as to apply pressure to the glass and cause it to crack off, a glass receiving table in advance of the runway, means for driving the rolls of the runway at the same speed as those of the leer, and other means for driving the rolls of the runway in advance of said cracking off member at an increased rate of speed.

2. In combination with a roller leer, a roller runway at the end of the leer for receiving the glass sheet as it emerges from the leer, a cracking off member extending transversely of the runway short of the end thereof below the glass and mounted for vertical movement, means for moving said member upward so as to apply pressure to the glass and cause it to crack off, a glass receiving table in advance of the runway, means including a one-way clutch for driving the rolls of the runway from the means which drives the leer rolls and at the same rate of speed, and other means including a one-way clutch for driving the rolls of the runway in advance of said cracking off member at an increased rate of speed.

3. A runway for use at the outlet end of a leer, comprising a series of rolls spaced along the runway in relatively fixed positions with respect to the length thereof, one of which rolls, located intermediate the ends of the runway is mounted for vertical movement, means for raising said roll so that its periphery lies above the level of the other rolls of runway, and means for driving said other rolls.

4. A runway for use at the outlet end of a leer, comprising a series of spaced driven rolls, and a cracking off roll located intermediate two of said driven rolls, an axle on which the cracking off roll is journalled, eccentric bushings secured to the ends of the axle, bearings in which such bushings are mounted for rotary adjustment, and means for turning the axle and bushings to adjust the cracking off roll vertically.

In testimony whereof, I have hereunto subscribed my name this 19th day of December, 1927.

CLAUD MOXLEY.